United States Patent [19]

Isenberg

[11] 4,171,785
[45] Oct. 23, 1979

[54] APPARATUS AND METHOD FOR MANUFACTURING LAMINAR FLOW CONTROL AIRCRAFT STRUCTURE

[75] Inventor: Jack M. Isenberg, Bellevue, Wash.
[73] Assignee: The Boeing Company, Seattle, Wash.
[21] Appl. No.: 811,744
[22] Filed: Jun. 30, 1977
[51] Int. Cl.² ............................................. B64C 3/26
[52] U.S. Cl. ................................... 244/123; 244/207; 244/209; 428/31
[58] Field of Search ............... 244/204, 207, 208, 209, 244/123, 131, 132, 120, 124; 156/230, 235, 249, 293, 248, 233, 257, 259, 268; 29/157.3, 157.3 R; 428/352, 919, 31, 293

[56] References Cited
U.S. PATENT DOCUMENTS

| 2,746,893 | 5/1956 | Matthes | 428/352 |
|---|---|---|---|
| 3,117,751 | 1/1964 | Rogers et al. | 244/209 |
| 3,276,933 | 10/1966 | Brandt | 156/230 |
| 3,279,969 | 10/1966 | Borchardt | 156/249 |
| 3,298,850 | 1/1967 | Reed et al. | 156/230 |
| 3,473,218 | 10/1969 | Travis | 156/248 |
| 3,475,259 | 10/1969 | Meserole | 428/31 |
| 3,521,837 | 7/1970 | Papst | 244/209 |
| 3,592,722 | 7/1971 | Morgan | 428/202 |
| 3,598,689 | 8/1971 | Feffer et al. | 156/249 |
| 3,810,812 | 5/1974 | Koenig | 156/268 |
| 3,985,602 | 10/1976 | Stuart | 156/235 |

OTHER PUBLICATIONS

"Laminar Flow Control." *Interavia* 8-1961, pp. 1101-1105.

Primary Examiner—Galen L. Barefoot
Attorney, Agent, or Firm—H. A. Richardson; B. A. Donahue; Lynn H. Hess

[57] ABSTRACT

A method for manufacturing a laminar flow control aircraft structure, typically a wing or other aerodynamic surface, having an outer skin in which a plurality of spanwise oriented and chordwise spaced recesses have been machined. The method includes the installation of a strip of slot assembly tape in each of said recesses, preferably with an adhesive, and the removal of an element of the tape called a cover plate to expose a spanwise slot through which boundary layer air can be drawn. Also disclosed is a slot assembly tape having a protective cover plate and a pair of sidewalls, and a laminar flow control aircraft structure, typically a wing, in which the slot assembly tape has been employed.

8 Claims, 10 Drawing Figures

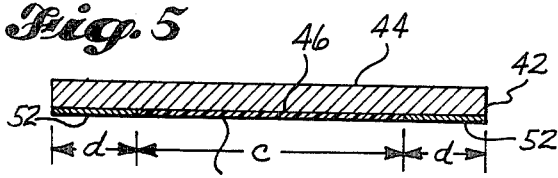
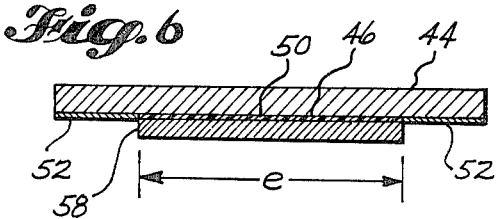
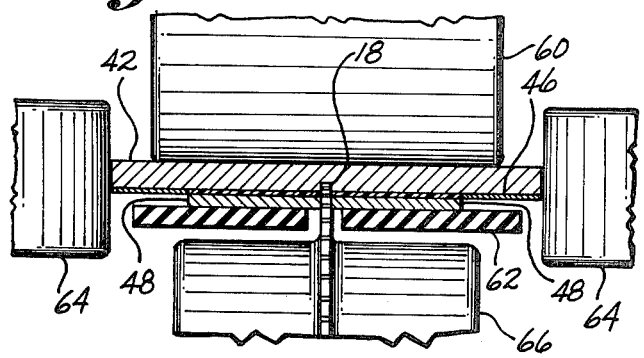
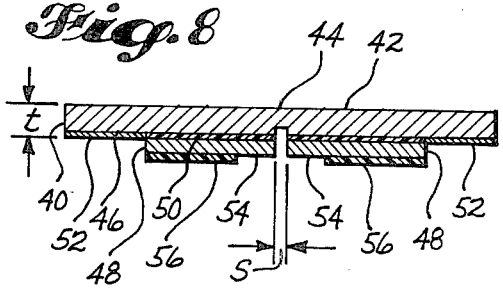
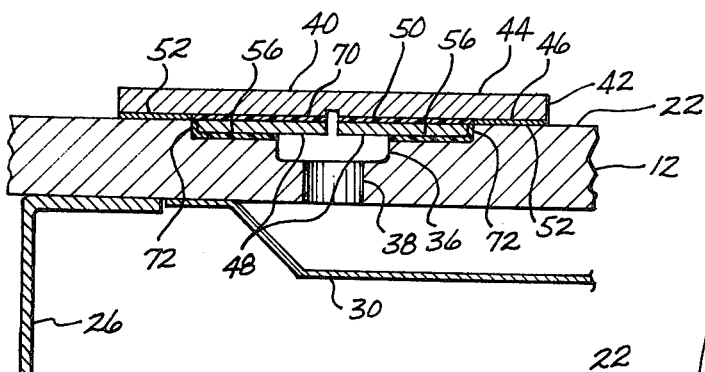
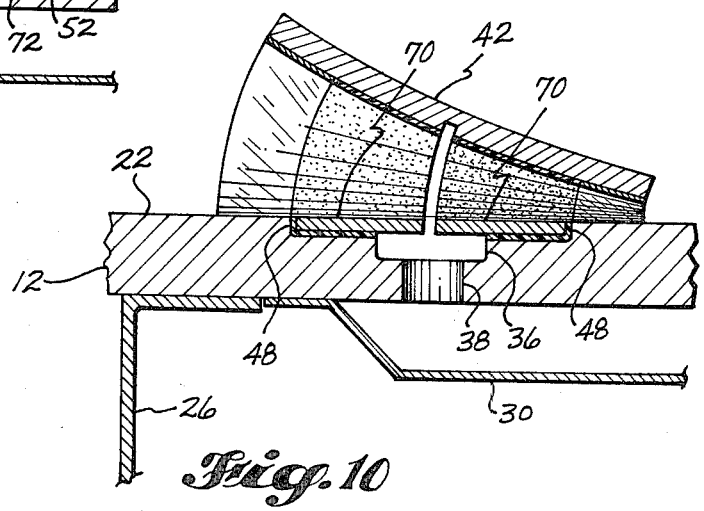

APPARATUS AND METHOD FOR MANUFACTURING LAMINAR FLOW CONTROL AIRCRAFT STRUCTURE

BACKGROUND OF THE INVENTION

This invention relates generally to aircraft structures and more particularly to a laminar flow control (LFC) structure and a method for manufacturing the same.

It is commonly understood that the boundary layer flow over the surfaces of an aircraft in flight is laminar over the upstream portions of the surfaces, but becomes turbulent over the downstream portions. It has been recognized for some time that the aerodynamic efficiency of airplanes could be increased significantly if the boundary layer flow could be maintained in a laminar condition over more of the aerodynamic surfaces, principally because the skin friction drag resulting from laminar flow is much less than the drag resulting from turbulent flow. It has also been known for some time that flow can be kept laminar by drawing a portion of the boundary layer through openings in the aerodynamic surfaces to prevent boundary layer build-up and consequent transition to turbulent flow. This technique has been tested and proven both in the laboratory and on full-scale aircraft.

In spite of the successes of these test programs the use of laminar flow control for production aircraft has generally been considered impractical for a number of reasons. First, the manufacture of structures incorporating laminar flow control according to earlier teachings was both complicated and prohibitively expensive. Next, most LFC wing designs involved unacceptable reductions in the available fuel volume and unacceptable increases in weight. In addition, inspection of the structures was difficult or impossible and field repair was complicated and expensive.

Basically, a laminar flow control system requires many small openings in the aerodynamic surfaces through which boundary layer flow can be drawn and a system of ducts located within the structure for carrying the boundary layer flow away. Most embodiments found in the prior art used some sort of double skin arrangement wherein boundary layer flow was drawn through slots machined directly in the outer skin and passed into ducts formed between the inner and outer skins.

Typical of such designs is the structure described in U.S. Pat. No. 3,117,751, to K. H. Rogers, et al. The patent discloses a structure consisting of an outer skin formed from a honeycomb sandwich panel which incorporates a slotted outer sheet, a honeycomb sandwich inner panel, and a number of spanwise stiffeners which are bonded to the outer panel and riveted to the inner panel.

Primary ducts are formed by the walls of the inner and outer skin and the bonded stiffeners, and small tributary ducts are attached to the inner surface of the outer skin panels. While this embodiment was successfully used in a full-scale research aircraft, it exhibited a number of deficiencies. The weight of the wing structure was significantly increased due to the inefficient use of the inner and outer panels as bending material. Manufacturing costs were significantly greater than for a conventional wing structure. Repair of the panels was difficult and costly and structural inspection required the removal of both the inner and outer panels. The design required the use of blind fasteners to attach the stiffeners to the inner skin panels, which provided undesirable fatigue characteristics and the possibility of fuel leakage into the duct areas. Unfortunately, no means was provided to detect such leakage. Further, the design also involved an estimated 17% reduction in volume within the wing available for fuel.

Another laminar flow control apparatus relevant to this invention is described in U.S. Pat. No. 3,521,837 to Hermann Papst. His patent appears to disclose an airfoil having a wing skin in which recesses and throttle holes have been machined into the upper surface. In one embodiment slots through which boundary layer air can be drawn are formed between the adjacent edges of two parallel strips of metal mounted on opposite sides of the upper portion of the recesses. In another, a plurality of slots are cut in a single strip of metal which is mounted in the upper recess. As with many other known laminar flow control devices this device would increase manufacturing costs and would be difficult to repair in the field. It would also be vulnerable to damage during subsequent manufacturing operations and would not insure smoothness of the upper skin surface after assembly.

In spite of the shortcomings of the various designs found in the prior art, recent emphasis on more efficient and economical aircraft designs has prompted a serious reconsideration of the use of laminar flow control devices. Accordingly, one objective of this invention is to provide for a method of manufacturing a laminar flow control structure which is more economical and practical than those formerly known. Another objective of this invention is to provide for a laminar flow control structure with an acceptable weight penalty and a minimal reduction in available fuel volume as compared to conventional structures. It is a further objective of this invention to provide for a laminar flow control structure which can be easily repaired in the field and which permits a structural inspection of skins and stiffeners. Finally, a further objective of this invention is to provide for a laminar flow control structure in which the smoothness of the external aerodynamic surfaces is assured to be within allowable tolerances.

SUMMARY OF THE INVENTION

In summary, this invention can be most broadly described as a method for manufacturing a structure for use in an aircraft having laminar flow control wherein the structure has an outer skin having a plurality of spanwise oriented recesses in its outer surface, the method comprising the steps of installing a strip of slot assembly tape, including a protective removable cover plate and a pair of sidewalls in each of the recesses, and removing the cover plate to expose the sidewalls and the slot formed therebetween. Also provided for is a slot assembly tape for use on aircraft having laminar flow control, including a removable cover plate and a pair of sidewalls attached thereto. Also claimed is an aircraft structure for achieving laminar flow control which includes an outer skin having a plurality of spanwise recesses in its outer surface and a plurality of space throttle holes located within each of the recesses, a plurality of spanwise ducts attached to the inner surface of the skin, a plurality of spanwise stringers attached to the inner surface of the skin in between the ducts, a plurality of chordwise oriented ribs attached to the stringers, and a plurality of strips of slot assembly tape, each disposed within an associated recess.

BRIEF DESCRIPTION OF THE DRAWINGS

FIGS. 5 through 8 illustrate the various steps in the preferred method of manufacturing the slot assembly tape.

FIG. 9 shows a detailed cross section of a portion of the upper wing skin of FIG. 2 to which a strip of slot assembly tape has been attached.

FIG. 10 shows the wing skin and slot assembly tape of FIG. 9 in which the cover plate has been partially stripped away.

DESCRIPTION OF THE PREFERRED EMBODIMENT

Figure 1:
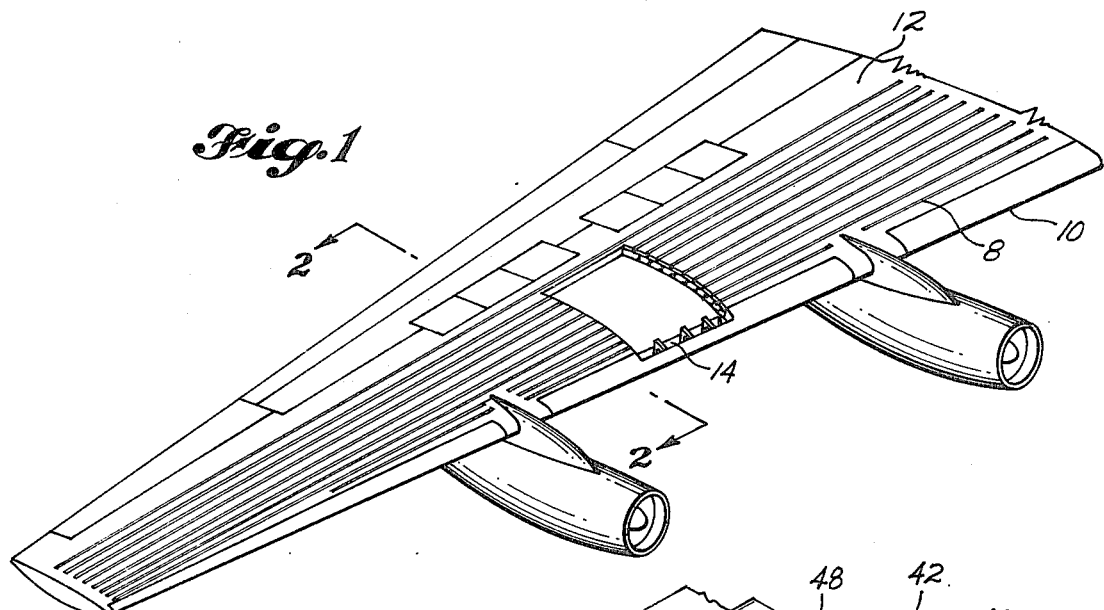
FIG. 1 is a perspective view of an aircraft wing structure having laminar flow control and embodying the present invention.

FIG. 1 shows a perspective view of an aircraft wing structure 10 in which the present invention has been incorporated. A rectangular portion of the upper wing skin 12 has been removed to show the construction of the wing between the front spar 14 and the rear spar 16. Visible on the upper wing skin 12 are a number of spanwise oriented slots 18 through which boundary layer airflow may be drawn to achieve laminar flow control.

Figure 2:
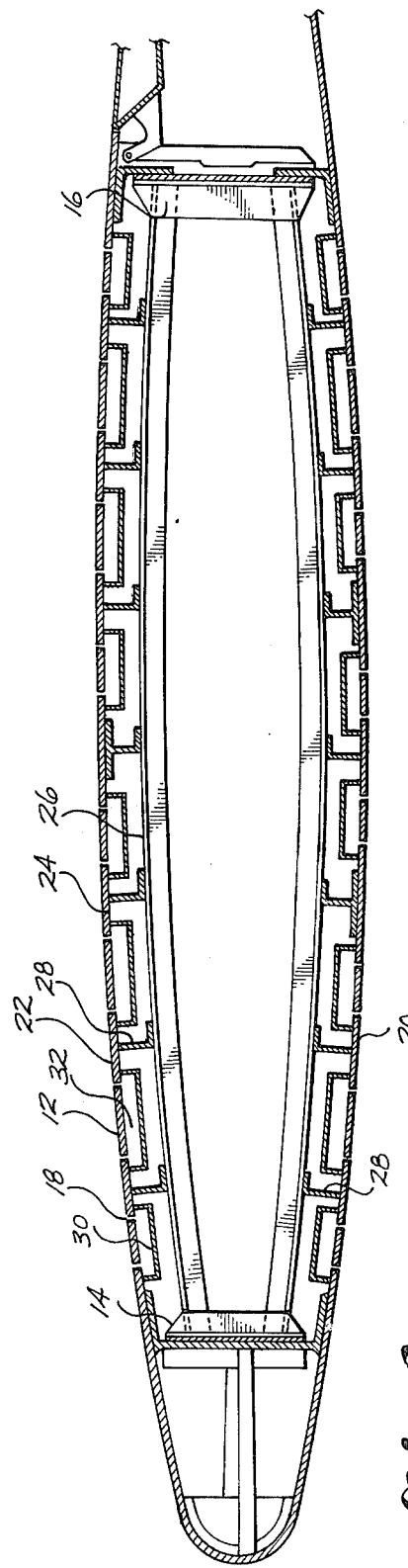
FIG. 2 is a cross-sectional view of the wing structure of FIG. 1 taken at 2—2.

A more detailed view of the wing construction is seen in the cross section of FIG. 2. Unlike many wing structures embodying laminar flow control found in the prior art, the construction is basically conventional. Front and rear spars 14 and 16 are each attached to upper wing skin 12 and lower wing skin 20. In that the constructions of the upper and lower portions of the wing are similar, only the upper portion will be discussed hereinafter. Upper wing skin 12 has an outer surface 22 which forms the upper aerodynamic surface of the central portion of the wing and an inner surface 24 which forms one wall of the fuel cell in portions of the wing where fuel is carried. A plurality of chordwise oriented ribs 26 extend between the front and rear spars and are attached to the wing skins by a plurality of spanwise stringers 28.

Figure 3:
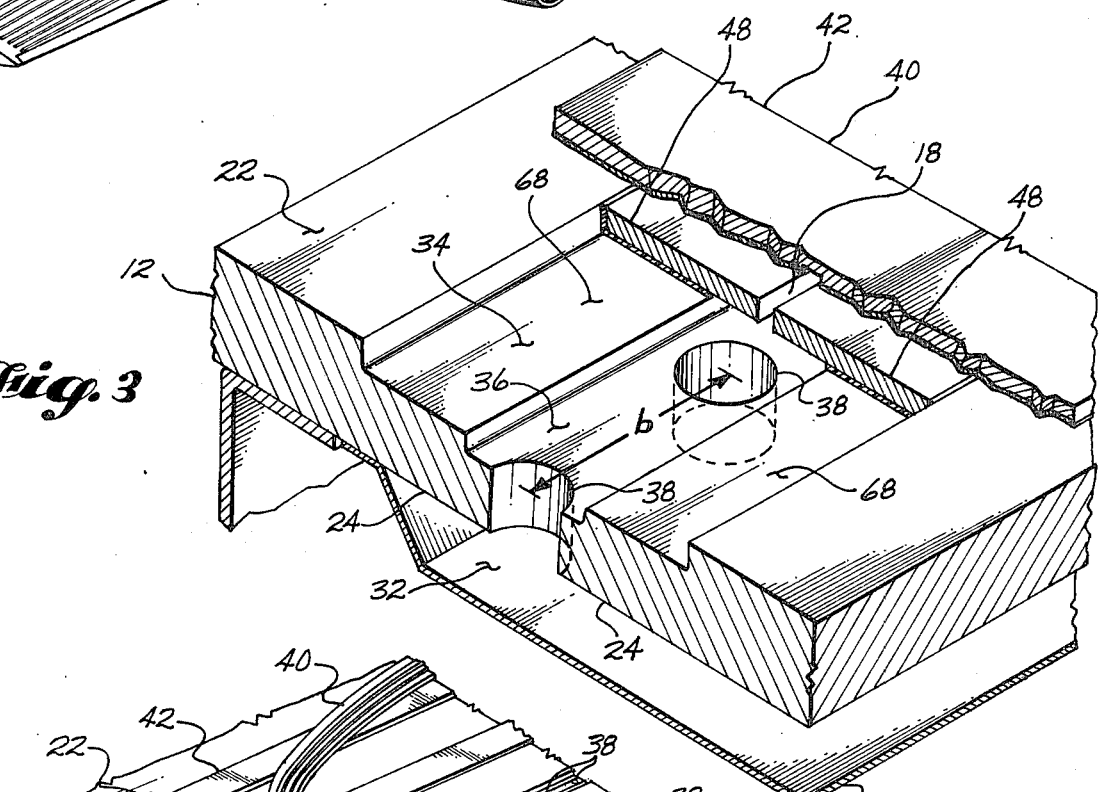
FIG. 3 is a detailed perspective view of a portion of the upper wing skin of FIG. 2.
Figure 4:
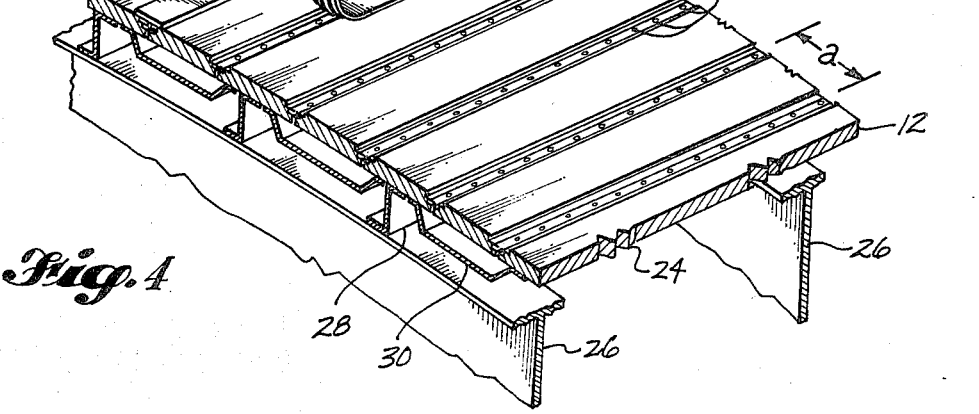
FIG. 4 is also a detailed view of the upper wing skin of FIG. 2, including the upper portion of a pair of adjacent wing ribs, and shows a partially installed strip of slot assembly tape.

A plurality of spanwise oriented fiber glass ducts 30 are bonded to inner skin surface 24 and form in cooperation with surface 24 a plurality of spanwise passageways 32 for the removal of boundary layer airflow. The passageways are connected to a means for providing suction, which is not shown. Communication between the outer atmosphere and passageway 32 is provided by means shown in greater detail in FIGS. 3 and 4. Referring to FIG. 4, it can be seen that a plurality of spanwise and substantially parallel recesses 34 have been machined or chem-milled into upper surface 22 of wing skin 12. Conceivably skin 12 could be made entirely of fiber glass rather than metal and recesses 34 could be formed during the lay-up process. The recesses are spaced apart in a chordwise direction a distance "a" which varies from approximately one inch near the leading edge of the wing to as much as six inches near the trailing edge. The exact spacing of the recesses should be adjusted to suit the particular aircraft to which this invention is adapted and can be computed by techniques well known to those familiar with the art.

Also formed as a portion of recess 34 is plenum recess 36, which is located within recess 34. A plurality of throttle holes 38 are drilled in plenum recess 36 and extend completely through skin 12 so as to provide communication between the plenum recess and passageway 32. Ordinarily, more uniform pressures can be obtained within the plenum during operation if the throttle holes are offset in a chordwise direction from an associated slot rather than located directly underneath it. Depending on the region of the wing in which they are located the holes normally have diameters ranging from 0.060 to 0.188 and are spaced a distance "b" in a spanwise direction which may vary from ⅜ in. to 10 in. Again, the diameter and spacing of the throttle holes must be suited to the particular aircraft involved and be calculated by techniques known to those skilled in the art.

After all recesses 34 have been machined in the skins and the wing torque box section has been substantially assembled, strips of slot assembly tape 40 can be installed in recesses 34 as shown in FIG. 4. A strip of slot assembly tape 40 is shown in greater detail in the cross-sectional views shown in FIGS. 8 and 10. Referring to FIG. 8, it can be seen that the tape includes a relatively thin aluminum cover plate 42 having an upper surface 44 and a lower surface 46. Nominal thickness "t" of the cover plate is approximately 0.030. Centrally located and attached to lower surface 46 is a pair of substantially parallel sidewalls 48 which are spaced a distance "s" apart. The sidewalls are preferably attached to the cover plate by means of a thin layer 50 of a relatively low-peel strength adhesive. One adhesive which has been used for this purpose is Paraplex 43 and P13 with Lupersol DDM, but other comparable adhesives may be substituted.

Strips of a parting agent 52 of width "c" have been applied to the outer opposing portions of lower surface 46 to insure that the cover plate will not accidentally be bonded to upper skin surface 22 when the tape is installed. For this purpose both teflon tape with a silicon adhesive and a product known by the trade name of "Free Coat 33" have been used successfully. Finally, a layer 56 of a high-strength adhesive, such as 3M "AF-30," approximately 5 mils in thickness, has been applied to the lower surfaces 54 of each of the sidewalls.

A suggested method of manufacturing slot assembly tape 40 is illustrated in FIGS. 5 through 7. In FIG. 5 cover strip 42 is shown after a layer 50 of low-strength adhesive of width "c" has been applied on the central portion of lower surface 46. Also, strips of parting agent 52 of width "d" have been applied to opposing outer areas of the lower surface. In FIG. 6 a metal strip 58 of uniform width "e," which is slightly greater than dimension "c," has been bonded to lower surface 46 with adhesive layer 50. Next, as illustrated in FIG. 7, the assembly of FIG. 6 is passed between roller 60 and table 62 while being centered by rollers 64. As the assembly passes over the table, slot 18 of width "s" is cut in the assembly by saw 66 which passes completely through strip 58 and partially into lower surface 46. As a result of this operation a pair of sidewalls 48 are formed and are automatically spaced apart a uniform distance "s." Finally, the tape is completed as shown in FIG. 8 by the application of layers 56 of high strength adhesive.

The next step involved in assembling the laminar flow control apparatus is to place strips of slot assembly tape 40 in recesses 34. The recesses have been machined so that surfaces 68 come into contact with adhesive layer 50 when upper surfaces 70 of the sidewalls are flush with upper skin surfaces 22. Recess 34 should have a width slightly greater than dimension "e" between outer end 72 of the sidewalls so that space is available for excess adhesive to flow into during installation. When the tape is in place, high strength adhesive 56 can be cured by applying a hot iron or roller to the cover plate.

It can be seen that one advantage of this invention is that external smoothness can be maintained in spite of slight variations in the thicknesses of the sidewalls and the depths of the recesses because the adhesive layer can be squeezed to various thicknesses to accommodate the tolerances. In other words, the slot assembly tape is self-indexing in the recesses. Another inherent advantage of this invention is that the relatively delicate surface members of the apparatus will be protected during the remainder of the wing assembly operations by cover plate 42, which can be left in place until the assembly of the aircraft is substantially complete. To ready the aircraft for flight cover plate 42 is simply stripped away from the wing skin surfaces, exposing slots 18 and sidewalls 48.

Although only one embodiment of this invention is described herein, it will be understood that all obvious changes and modifications to the invention may be made by those skilled in the art to which this invention pertains without departing from the spirit and scope of the invention as set forth in the claims appended hereto.

I claim:

1. A method for manufacturing a laminar flow control structure for an aircraft, said method comprising the steps of:
   providing an outer skin including an outer surface exposed to airflow and defining a spanwise recess therein;
   providing a slot assembly tape including a pair of sidewalls removably attached to a cover plate;
   positioning said slot assembly tape over said recess;
   bonding said pair of sidewalls within said recess with a first adhesive; and
   stripping away said cover plate to expose said sidewalls.

2. The method of claim 1 wherein said first adhesive is a pressure-sensitive adhesive.

3. A method for manufacturing a laminar flow control structure as in claim 1 including the additional steps of:
   forming said slot assembly tape by providing a strip of stiff material and bonding said strip of stiff material to a first portion of a lower surface of said cover plate with a second adhesive; and
   cutting a slot completely through said strip of material to form said pair of sidewalls, each having a lower surface.

4. The method of claim 3 wherein said slot is of uniform width.

5. The method of claim 3 further including the step of applying a layer of a third adhesive to the lower surface of each sidewall.

6. The method of claim 3 further including the step of applying a parting agent to a second portion of said lower surface of said cover plate.

7. A method for manufacturing a laminar flow control structure for an aircraft, said structure including an outer surface having a plurality of spanwise recesses therein, comprising the steps of:
   bonding a metal strip of stiff material to a first portion of a lower surface of a cover plate with a first adhesive;
   cutting a slot completely through said metal strip to form a pair of spaced sidewalls;
   positioning said pair of sidewalls within an associated spanwise recess using said cover plate as a guide; and
   bonding said pair of sidewalls within said recess with a second adhesive.

8. The method of claim 7 further including the step of stripping away said cover plate to expose said sidewalls.

* * * * *